United States Patent
Lee et al.

(10) Patent No.: US 7,297,273 B2
(45) Date of Patent: Nov. 20, 2007

(54) METHOD OF INTENSIFIED TREATMENT FOR THE WASTEWATER CONTAINING EXCRETA WITH HIGHLY CONCENTRATED NITROGEN AND COD

(76) Inventors: Kon Joo Lee, 124-1 Gumgoak Dong, Anndong Si, 102-2405 Taesung Kyongann Town, Gyongbook 760-250 (KR); Kui Young Lee, 313 S. President St., Carol Stream, IL (US) 60188; Wonjin Jennifer Lee, 313 S. President St., Carol Stream, IL (US) 60188; James Yeonhong Lee, 313 S. President St., Carol Stream, IL (US) 60188

( * ) Notice: Subject to any disclaimer, the term of this patent is extended or adjusted under 35 U.S.C. 154(b) by 10 days.

(21) Appl. No.: 11/280,320

(22) Filed: Nov. 17, 2005

(65) Prior Publication Data
US 2007/0108123 A1 May 17, 2007

(51) Int. Cl.
*C02F 3/34* (2006.01)
(52) U.S. Cl. .................. 210/602; 210/620; 210/631
(58) Field of Classification Search ............ 210/602, 210/615–617, 620, 631; 71/6, 8, 9, 21
See application file for complete search history.

(56) References Cited

U.S. PATENT DOCUMENTS

| 3,586,625 | A | * | 6/1971 | Cole et al. | 210/603 |
| 3,780,471 | A | * | 12/1973 | Ort | 210/602 |
| 5,071,462 | A | * | 12/1991 | Kimura | 71/7 |
| 5,407,576 | A | * | 4/1995 | Wolf et al. | 210/602 |
| 5,670,046 | A | * | 9/1997 | Kimmel | 210/602 |
| 2002/0153303 | A1 | * | 10/2002 | Oswald et al. | 210/603 |

* cited by examiner

Primary Examiner—Fred G. Prince
(74) Attorney, Agent, or Firm—GWiPS

(57) ABSTRACT

A method of biological treatment is developed for completely removing the compost remaining after decomposing the dissolyed organic matter (COD) in wastewater by the bacteria or fungi. It comprises the steps of: adopting the algae and diatoms cultivated under the special conditions to treat wastewater containing excreta, applying Calcium Salt and Silica Salt to develop a competence cell in the algae and diatoms, removing insoluble composts after decomposing the dissolyed organic matter (COD), removing pollutants in the wastewater by flowing through a series of multi-stage filtering tanks consisting of 3~1,000 stages each 4~8 inches in width and sequentially treating the wastewater through the algae and diatoms cultivated under different conditions, improving the cultivation efficiency of the algae and diatoms by installing artificial illumination, insulating the cultivation place of the algae and diatoms to maintain optimum temperature, and stimulating the algae to photosynthesize with nitrate-gas without forcibly expelling to the air.

2 Claims, 6 Drawing Sheets

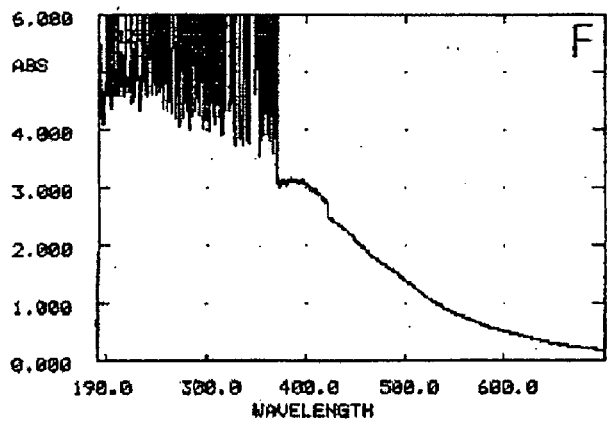

Fig. 6b

Table 1. An example of a current swine waste treatment result

| Contaminants | Flushed Wastewater | After Solids Separation | After Biological Treatment | % Removal |
|---|---|---|---|---|
| COD | 20,000 ~ 50,000 mg/l | 1000 ~ 2000 mg/l | 100 ~ 500 mg/l | 99% |
| Nitrogen (N-$NH_3$) | 500 ~ 1000 mg/l | 400 ~ 600 mg/l | 10 ~ 40 mg/l | 98% |

Table 2. Current technology result vs. experimental result using new technology

| Contaminants | Flushed Wastewater | After Biological Treatment | % Removal per Current Technology | Influent Used in the Research | After the Experiment |
|---|---|---|---|---|---|
| COD | 20,000 ~ 50,000 mg/l | 100 ~ 500 mg/l | 99% | 350 mg/l | < 3 mg/l |
| Nitrogen (TN) N-$NH_3$ | 500 ~ 1000 mg/l | 10 ~ 40 mg/l | 98% | 60 mg/l | < 1 mg/l |
| BOD | - | - | - | 20 mg/l | < 1 mg/l |

Fig. 7

METHOD OF INTENSIFIED TREATMENT FOR THE WASTEWATER CONTAINING EXCRETA WITH HIGHLY CONCENTRATED NITROGEN AND COD

BACKGROUND OF THE INVENTION

1. Field of the Invention

The present invention relates to intensified treatment of wastewater containing excreta that is contaminated with highly concentrated Nitrogen and dissolved organic matter (COD). More particularly, plants such as algae and diatoms cultivated under a special environment are adopted to effectively remove the insoluble residues of Nitrogen and COD in nature.

2. Related Prior Art

There are three essential needs, i.e., water, air, and soil, for life to survive in this world. However, our environment is contaminated year by year to such a point that we have to worry about the drinking water and breathing air. Due to increasing pollutants, such as carbon dioxide ($CO_2$), oxides of nitrogen ($NO_x$) or dioxin in the air, the global weather becomes unstable. Furthermore, the toxic wastewater discharged from the industrial plants or farmland without sufficient treatment pollutes our reservoirs.

The facts listed below are a few of many life threatening water pollution issues stemming from livestock farms:

California officials identify agriculture, including cattle farms, as the major source of nitrate pollution in more than 100,000 square miles of polluted groundwater.

Huge open-air waste lagoons, often as big as several football fields, are prone to leaks and spills. In 1995 an eight-acre hog-waste lagoon in North Carolina burst its banks, spilling 25 million gallons of manure into the New River. The spill killed about 10 million fish and closed 364,000 acres of coastal wetlands to shell fishing.

From 1995 to 1998, 1,000 spills or pollution incidents occurred at livestock feedlots in 10 states and 200 manure-related fish kills resulted in the death of 13 million fish.

Ammonia, a toxic form of nitrogen released in gas form during waste disposal, can be carried more than 300 miles through the air before being dumped back onto the ground or into the water, where it causes algal blooms and fish kills.

These examples are only part of countless water pollution problems that current livestock farms face. Even with the current technology, the amount of COD and nitrogen generated are still large enough to cause pollution.

The tertiary treatment for the swine farm waste matters were evaluated in the laboratory and in full-scale microalgal ponds and achieved the removal of COD, BOD, inorganic nitrogen and orthophosphate up to 57%, 69%, 79% and 74%, respectively. Despite much research, a complete treatment for swine excreta has not yet been developed. As a result, it still causes pollution in the water reservoirs.

Further research is ongoing to develop a bio-filter for lowering the highly concentrated nitrogen. Other research is being performed for developing a bio-film to lower COD concentrations. A study has reported that the removal rate of the COD is up to 65% (from 1500 to 380 mg/L) by using the bio-film.

Even though many studies are ongoing in the field of wastewater treatment, there are no perfect solutions developed to prevent water pollution.

Despite the tremendous efforts to reduce pollutants, the current technology is inadequate to effectively prevent the increasing pollution.

SUMMARY OF THE INVENTION

In order to overcome the aforementioned problems, a biological treatment means for completely removing the final residues discharged from dissolved organic matter (COD) is provided.

An objective of the present invention is to employ algae and diatoms that are cultivated under special conditions to treat wastewater containing animal or human excreta, applying Calcium Salt and Silica Salt to develop a competent cell in the algae and diatoms, removing un-dissolved residues after decomposing the dissolved organic matter (COD) contained in the wastewater and animal excreta, removing pollutants contained in the wastewater through a series of multiple stage treatment tanks consisting of 3~1,000 steps, each 4~8 inches in width, and sequentially diluting the wastewater under different cultivating conditions.

Another objective of the present invention is to provide an elevating means for efficiently cultivating the algae and diatoms by using artificial illumination, a means for insulating the cultivation site of the algae and diatoms with vinyl or glass to maintain optimum temperature, and a means for photosynthesizing nitrate gas without forcibly expelling nitro-nutrition dissolved in the wastewater to the air.

BRIEF DESCRIPTION OF THE DRAWINGS

FIG. 6b is an UV scanning of wastewater containing coffee residues treated by the bacteria and fungi.

FIG. 7 shows Table 1 for a result of the swine wastewater treatments and Table 2 for comparing the treatment results of the new and old technologies.

DETAILED DESCRIPTION OF THE PREFERRED EMBODIMENT

Figure 1:
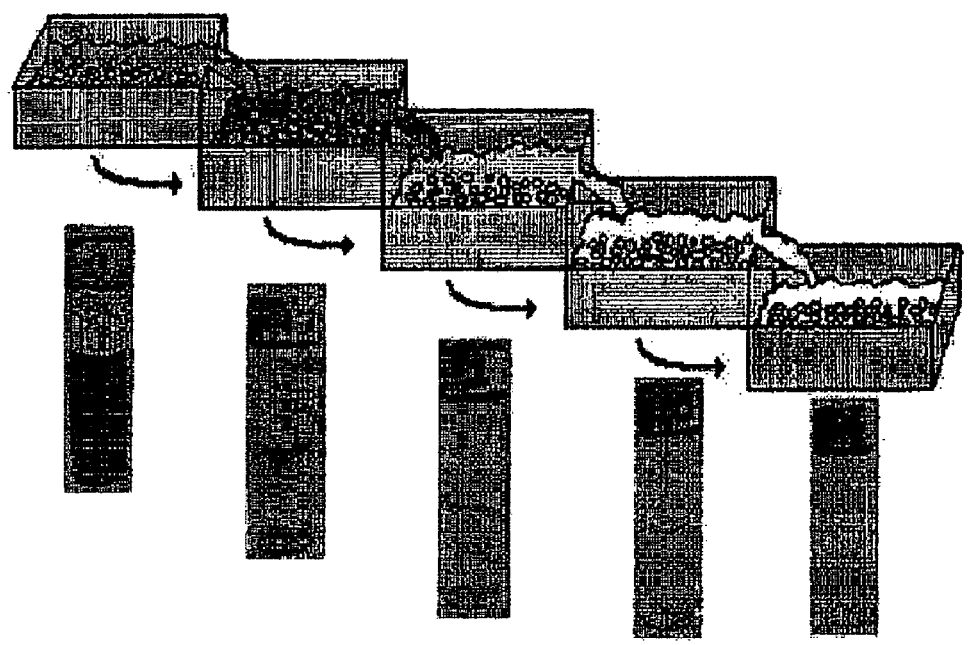
FIG. 1 is a series of multi-stage treatment tanks of the present invention.

Ecosystems are dynamic entities composed of the biological community and the abiotic environment. The composition and structure of biotic and abiotic members of the ecosystem are determined by the state and numbers of interrelated environmental factors.

The natural ecosystem made up of abiotic factors and biotic factors, i.e., plants, animals, and microorganisms. The flow of energy and matter through the ecosystem is regulated by the complex interactions of the energy, water, carbon, oxygen, nitrogen, phosphorus, sulfur, and other cycles that are essential to the functioning of the biosphere. Biotic factors consist of three kinds: Plants, such as algae, diatoms, and photo-bacteria belong to the production class, animals belong to the consumer class, while bacteria and fungi belong to the decomposer class. The elements composed of the plant and animal in nature are decomposed for circulation by the bacteria and fungi class. Even though the decomposer class decomposes the production and consumer classes, there always remains some Humic acid. Plenty of Humic substances, which are ubiquitous in the environment, are built up in the forest or soil. They may constitute as much as 95% of the total dissolved organic matter in aquatic systems and often are equal to or greater than the concentrations of inorganic ions present.

Over the last 150 years much has been learned about the chemistry of organic matter. Some of the earliest work by Sprengel on the fractionation of organic matter still forms the basis of methods currently in use. These methods utilize dilute sodium hydroxide (2 percent) to separate humus as a colloidal sot from alkali-insoluble plant residues.

The environmental contaminants of recent concern are pharmaceuticals, estrogens and other endocrine disrupting chemicals (EDC) such as degradation products of surfactants, algal and cyanobacterial toxins, disinfection by-products (DBPs) and metalloids. In addition, pesticides, especially their transformation products, microorganisms, and Humic substances (HS), in their function as vehicles for contaminants and as precursors for by-products in water treatment, traditionally play an important role.

If the Humic acid were combined with iodine, it would be a serious problem for the tap water.

After treating the wastewater containing the human or animal excreta, the Humic acid still remains in the treated water. In the case of human, when the human eats and digests the food to absorb nutrition, the remaining substance is discharged by the bowel movement. Then, a lot of bacteria are proliferated to further decompose the remaining substance. The process of producing Humic acid in the animal case is similar to the case of human. Because the dissolved organic matters cannot be completely removed during the wastewater treatment process, it will cause a water pollution problem.

Since a century ago, bacteria and fungi have been used for decomposing the wastewater containing excreta. The food in the human's stomach and intestinal tract is decomposed by digestive enzymes, and the human bowel movements are decomposed by bacteria and fungi in nature.

For the general case, most dissolved organic matters in the influent wastewater are decomposed by the bacteria and fungi and the black colored residues of the insoluble organic matters remain. To remove such insoluble organic matters, it will require the huge, costly, and complicated facilities.

In the active sludge method, the bacteria and fungi decompose the dissolved organic matters in the wastewater. At the same time, plenty of final product remains, which is known as compost, consisting of insoluble organic matter (BOD, COD). Such compost in the wastewater consists of a hundred species of low molecular substances that are hard to decompose by the bacteria and fungi.

The objective of the present invention is to provide a new technology to treat the compost that is insoluble organic matter in the wastewater at relatively lower cost. Under the special environment, the cultivated algae and diatoms will absorb the insoluble organic matters in the wastewater, which originally belongs to the plant species.

Up to the present time, the scientist understands that the bacteria or fungi belong to and act as a decomposer in the Ecosystem. Therefore, the scientist uses the bacteria and fungi for decomposing excreta. Nevertheless, a new discovery through the present research shows that the bacteria and fungi act as not only the decomposer, but also a consumer similar to the role of the human being in the Ecosystem. The compost which remains after decomposing by the bacteria or fungi are analogous to the bowel movement of the human being.

The foods in our stomach are decomposed by the digestive enzymes for absorbing the nutrition into our body. The nutrition absorbed in our body is further decomposed in the blood cells by enzymes or hormones and finally the remaining residues are discharged through the urine. The food decomposed in our body by the digestive bacteria turns to a bowel movement. The mixture of urine and bowel movement is further decomposed by the stronger bacteria in the septic tank.

Accordingly, the scientist uses the bacteria or fungi for treating the waste material. Up to the present time, the algae and diatoms are rarely used to treat the waste material. Furthermore, since animal excreta have already decomposed once in the animal's stomach, it takes a longer time to be further decomposed by the stronger bacteria and fungi and insoluble organic matters remain in the nature quite a longer time.

Even though the commercialized treatment of the swine excreta includes a biological treatment after separating the solid stuff, the effluent of the treated water still contains COD in concentrations of 100~500 ppm, which is not suitable to discharge into the environment. The Total Nitrogen (TN) has a level of 10-40 ppm, which is high enough to pollute the water reservoir.

The conventional treatment method uses a flocculant to separate the solid portion and the liquid portion from the collected swine farm excreta. The separated liquid portion is primarily treated by the active sludge treatment method, and then the treated liquid portion is discharged through ultra filtration.

It is also hard to treat the wastewater or sewage containing human excreta. Due to the composts, which are insoluble COD, it causes water pollution. The sewage disposal plant uses the active sludge treatment method to remove the organic substance and nitrogen components. However, the treatment efficiency is very poor because the wastewater contains too many insoluble organic substances. Therefore, the scale of the treatment facility is getting larger to remove the large amount of BOD and nitrogen.

The treatment facility comprises a series of 3 to 1,000 multiple stage treating tanks, each approximately 4~8 inches in width. While the wastewater being treated is flowing down the series of stages, the effluent of wastewater is treated by the photosynthesis of the algae. Each tank is filled with a mixture of soil 70%, oyster powder 25% and phosphate rock 5%.

Once the city sewage water, or the wastewater separated from the solid stuff, has passed through the collecting basin, Calcium salt (50 ppm of Ca(OH)2) is added to the water being treated.

Due to the Calcium salt reaction, the cell membrane of the algae and diatoms will change to increase the permeability and easily absorb the residues of the dissolyed organic matters in the wastewater being treated. Once the algae and diatoms absorb the residues of the dissolyed organic matters, it will be used to photosynthesize in their cells.

Under a special environment, plants such as algae and diatoms have a tendency to form excellent solubility cells. Those plants are able to absorb the insoluble organic matter, which the bacteria could not decompose. Even though the Calcium Salt is not added in the treating tanks, the algae and diatom flourish. But, it is found that the COD substances are not significantly diminished.

The soil is used as a filtering material because the diatom requires Silica to proliferate.

As presently known, the algae and diatoms belong to a class of independent nutrition species that produces carbohydrates, which are necessary to proliferate and survive, by photosynthesis.

According to the present research, it is newly discovered that the algae and diatoms are absorbing the insoluble organic substances in the wastewater while the algae and diatoms are photosynthesizing with nitrogen and carbonate. It is also verified that more than 95% of the dissolyable organic substances known as Humic acid are consumed as the algae and diatoms grow.

The Humic acid is a residue that is left over after the bacteria and fungi have decomposed the dissolyed organic matters in the wastewater over a long period of time.

The residues of the sewage, animal excreta and human bowel movement are the remaining insoluble organic matter after decomposition by the bacteria or fungi for a long time. Through the present research, it is discovered that the algae and diatoms have the capability to absorb the residues that remain after the bacteria and fungi have decomposed the dissolyed organic matters in the wastewater. This discovery is applied to the new concept of treatment. However, this concept extends the current understanding that organic matter is decomposed by the bacteria and fungi.

By virtue of the present discovery, it becomes possible to employ algae and diatoms to effectively decompose the insoluble organic substances in wastewater.

The treating process is as follows: the sewage water or wastewater flows down through a series of multi-stage filtering tanks, which contain transplanted algae and diatoms along with filtering materials. It will take 5 to 7 days to fully grow the transplanted algae and diatoms.

Each filtering tank has a compartment wall to sequentially over-flow the wastewater along the flow stream. There are several different kinds of algae and diatoms being cultivated depending on the concentration of pollutants in the wastewater, from a higher level to a lower level. In order for the algae and diatoms to survive in the highly concentrated wastewater, the highly concentrated wastewater at the initial stage may be diluted by mixing with the finally treated wastewater. It is recommended that the wastewater being treated must have COD levels of 60 ppm at the initial stage of the treatment.

Due to the varying concentration of the wastewater along the flow stream, the environmental conditions of the cultivated algae and diatoms are different along the treatment stages.

The algae and diatoms transplanted from natural streams are easily enriched while the algae and diatoms are in contact with the wastewater.

Daylight is good to cultivate the algae and diatoms. However, it may be needed to install artificial illumination and thermal insulation for the night time hours. A glass, plastic or vinyl cover could be used for protection or thermal insulation of the cultivating algae and diatoms. In order to stimulate the photosynthesis of the cultivating algae and diatoms, a small amount of air may be supplied in the treatment tanks. Such a treatment method of the present invention results in wastewater that is clean enough to solye pollution problems.

Regarding the structure of the New Treatment Method, a new technology uses a combination of the conventional wastewater treatment with the algae and diatoms to complement the insufficient wastewater treatment and bring the water treatment technology to near perfection. The conventional wastewater treatment uses the method of de-nitrification to convert the toxic substances, such as NO2 and NH4, into a stable nitrate. This process requires a highly expensive treatment facility. However, the amount of nitrate reduction by the conventional de-nitrification method is not sufficient to cut down the current pollution levels. The new method could solye both high cost issues and insufficient wastewater treatment technology.

The new treatment process incorporates the idea of ecosystem balancing. Total nitrogen (TN) is eliminated through a decomposition process in the ecosystem while the synthesis process is performed by the water plants and microorganisms in the water. The microorganisms use (absorb) the waste products in the wastewater such as NO3, NH4 and CO2, as their nutrition resources. As microorganisms and water plants grow, NO3, NH4 and CO2 are eliminated from the wastewater. Therefore, the major water pollutants, NO3 and NH4 are naturally eliminated while CO2 is removed from the air.

Additives are used to balance the wastewater being treated. From the conventional wastewater treatment system, the water flows through the final process still containing high COD which creates a "dead zone" where there is not enough oxygen to support aquatic life. Since the new treatment process will reduce the remaining high COD and nitrate from the water, "dead zone" issues will be resolved. Therefore, the treated water is nearly equal to spring water at the end of the treatment process.

As shown in FIG. 1, the bottle marked "0" contains swine wastewater treated by the conventional biological treatment. After applying the new method, slight improvement was made in the bottle marked number "1". After several steps, the bottle marked number "4" became significantly clear, to a quality level near that of pre-processed tap water.

The wastewater of hog's excreta, which is three times more toxic than that of human, causes a serious polluting problem to the water. As previously mentioned, the conventional technology can remove only 98 or 99% of the contaminants in wastewater. However, using the new technology, almost all contaminants were removed in the fully treated wastewater.

The experimental data is shown in Table 2, representing the most highly effective method found in the conventional wastewater treatment. In this research, the test medium was collected from a swine wastewater treatment facility in South Korea. The wastewater sample was collected from the water that had undergone the complete treatment process, which has COD level of 350 mg/l, total nitrogen (TN) level of 60 mg/l, and biological oxygen demand (BOD) level of 20 mg/l.

Even though the wastewater had been fully treated by the conventional technology, it still contained levels of COD and nitrogen high enough to threaten the water reservoirs. It is prohibitively expensive to lower the contaminants in the wastewater to the level of pre-processed tap water.

Figure 2:
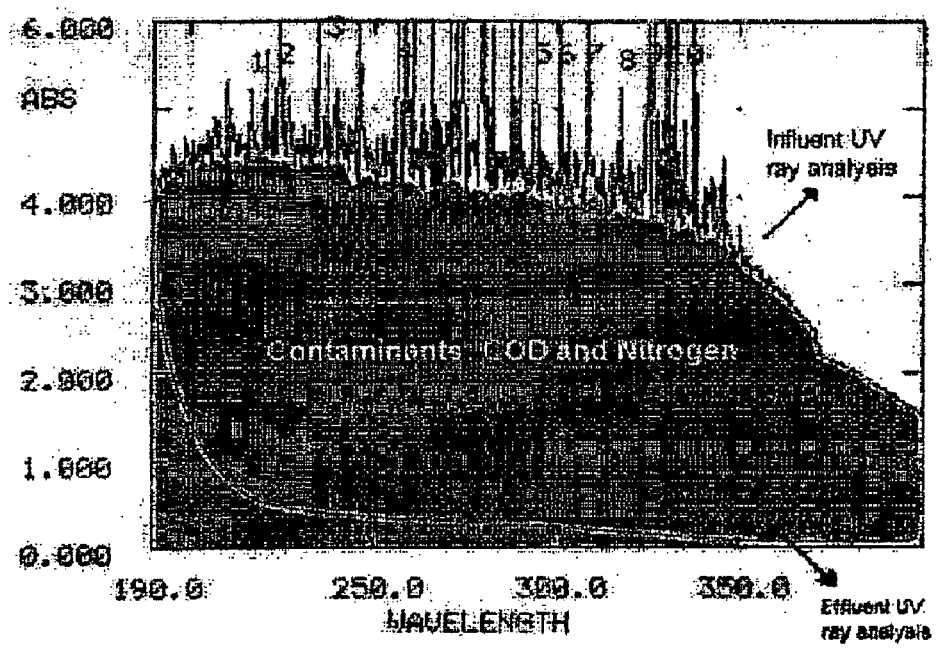
FIG. 2 is an UV scanning for comparing the swine wastewater treatments.

As shown in FIG. 2, the UV ray analysis of influent and effluent wastewater in the present experiment is presented. UV analysis shows more peaks whenever there is some kind of substance in the wastewater. The peak and enclosed area is the scanning result of swine wastewater after conventional biological treatment. The blue area shows the scanning result of the treated sample undergoing the new method of this research. Most residue contaminants are removed, as shown in the brown area. Further, the blue portion of the remaining residue contaminants can be reduced further by increasing the duration of the treatment.

This research has discovered an advanced method to fully treat water that still contains high levels of residue contaminants to the level of pre-processed tap water, reducing the amount of residue contaminants to less than 1 to 3 mg/l at an optimal cost. Although the new technology requires 10% additional cost compared to a conventional treatment system, the new technology will eliminate a system of higher cost in the current treatment system. Consequently, the overall cost is significantly reduced compared with the conventional wastewater processing system.

Figure 3:
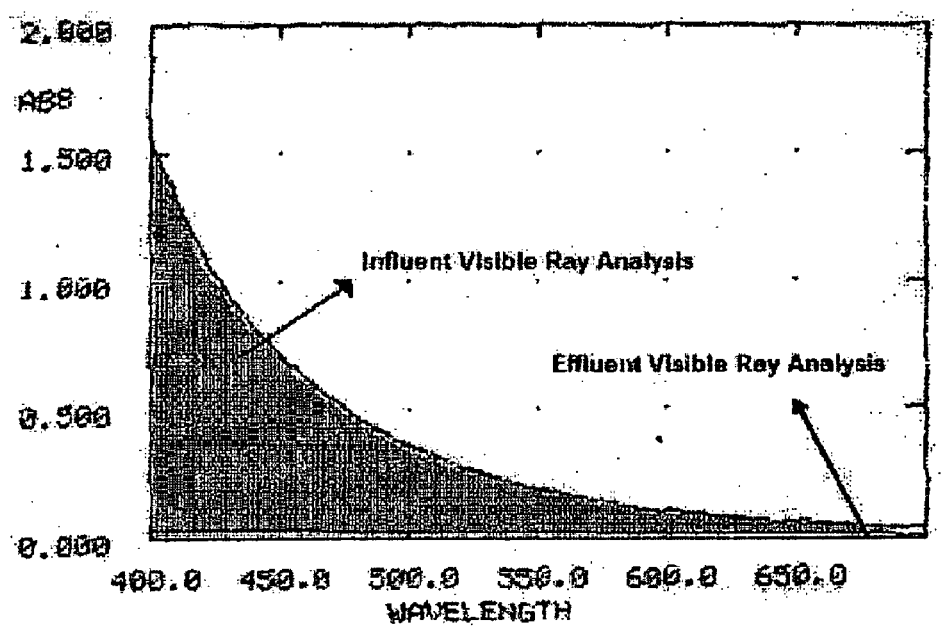
FIG. 3 is a visible ray scanning for comparing the swine wastewater treatment methods.

As shown in FIG. 3, visual ray analysis of influent and effluent wastewater in this experiment is presented. The visual ray analysis represents how many opaque particles are present in the water. The figure shows the influent having an absorbency of 1.500 at a wavelength of 400.0 nm. At the same wavelength, the absorbency of the effluent is significantly reduced, down to 0.020. The entire yellow area was reduced down to the tiny blue area along the horizontal axis after adopting the new treatment method. The most purified water (double distilled water) would be just a line along the horizontal axis.

When the new highly effective wastewater treatment is applied to current wastewater facilities throughout the world, the current water pollution crisis can be resolved.

The present research addresses the current insufficient wastewater treatment process providing the following results:
1. Significant reduction of chemical oxygen demand (COD) and nitrate in wastewater that had been already processed through a conventional treatment system up to 99%.
2. The reduction of the large amount of COD and nitrate in the water helps to prevent algal bloom and red tide in the long term.
3. Reduction of a significant amount of carbon dioxide in the air.

Accordingly, the present research results reveal the following:
1. The current swine wastewater treatment level is limited to COD 100-500 mg/l, TN 10-40 mg/l. Through this research, it was found that it is possible to treat the final product once more to achieve a 99% reduction, which is down to COD<3 mg/l, TN<1 mg/l, and BOD<1 mg/l. This contaminant level can be improved further by lengthening the process period.
2. It was found that non-decomposition materials found in swine wastewater were perfectly decomposed by algae and diatoms. Many other contaminant products that can be seen by UV ray had been mostly eliminated as well as those seen by visible ray (refer to attached test data graph).
3. As the population of algae and water plant increases using TN as their nutrition resource, mineral substances are eliminated to the point of pre-processed tap water condition.
4. The additional cost to further reduce the amount of contaminants in conventionally treated wastewater up to 99% is minimal compared to the current treatment system/equipment.
5. In the long term, as this new method of wastewater treatment is applied, algal bloom and red tide issues will be resolved.
6. Algae and plant products collected from the water treatment process can be used as alternative resources such as fertilizer or alternative energy material.

Currently in S. Korea, over five hundred thousand tons of treated wastewater containing nitrogen is discharged through rivers to the ocean per year. Thus, by collecting this amount of nitrogen as plants can result in collecting 50 million tons of CO2 from the air. This amount is five times the target rate of ten million tons for the current South Korean government. (Assuming C:N ratio of Algae as 30:1 then converting to CO2 will bring about 100 times.)

Therefore, if the new technology is applied, the impacts on water and air environments are tremendous. This research found that improvement on current wastewater treatment processes could resolve both water and air pollution. This new method will bring nearly perfectly treated water at a much lower cost. Thus, tremendous positive results can be achieved by combining elimination of water pollutants such as COD and nitrate with air pollutants such as CO2.

IMPLEMENTING EXAMPLE 1

Figure 4:
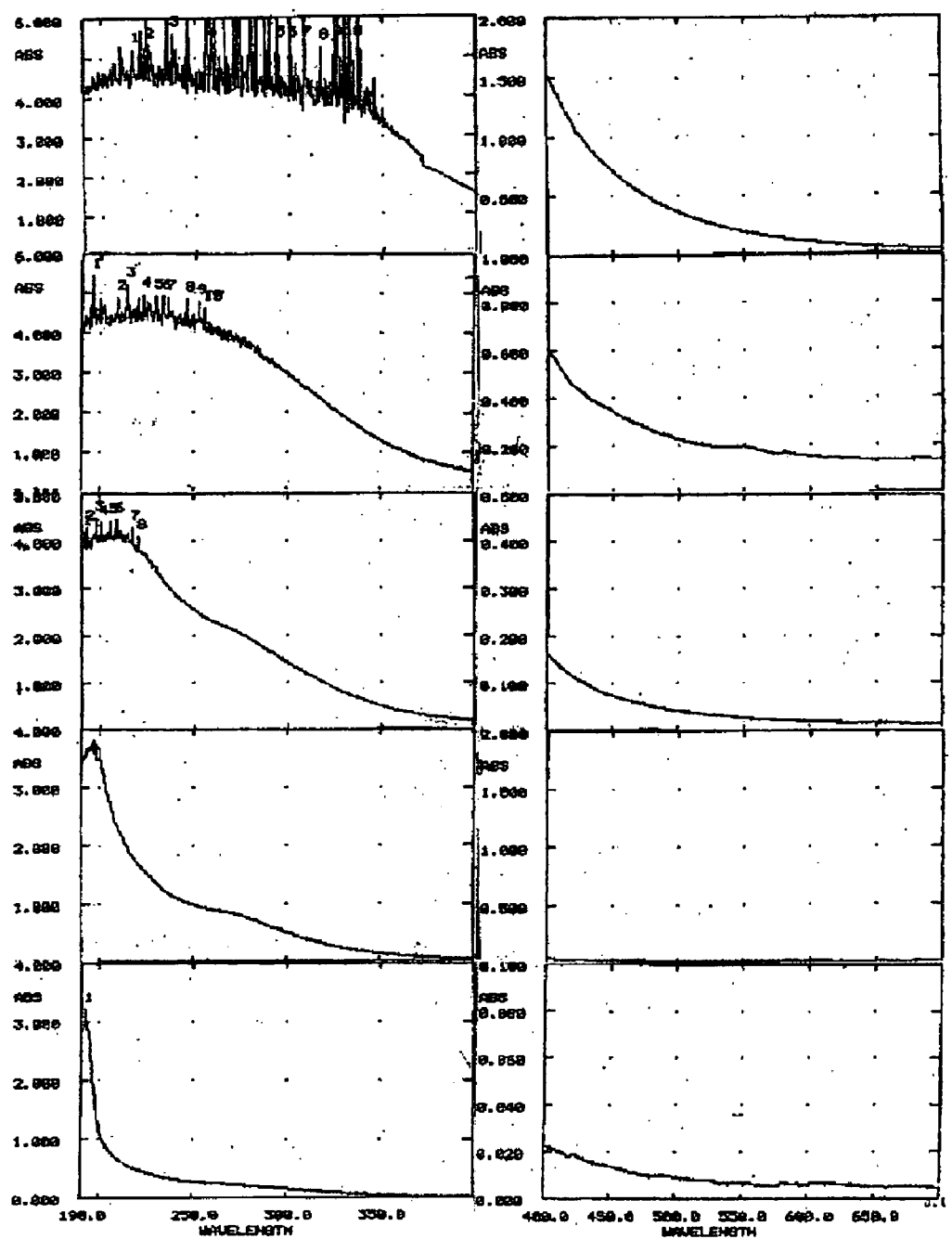
FIG. 4 is an UV scanning of the swine wastewater treated by the algae and diatoms to show progressing for a week interval.
Figure 5:
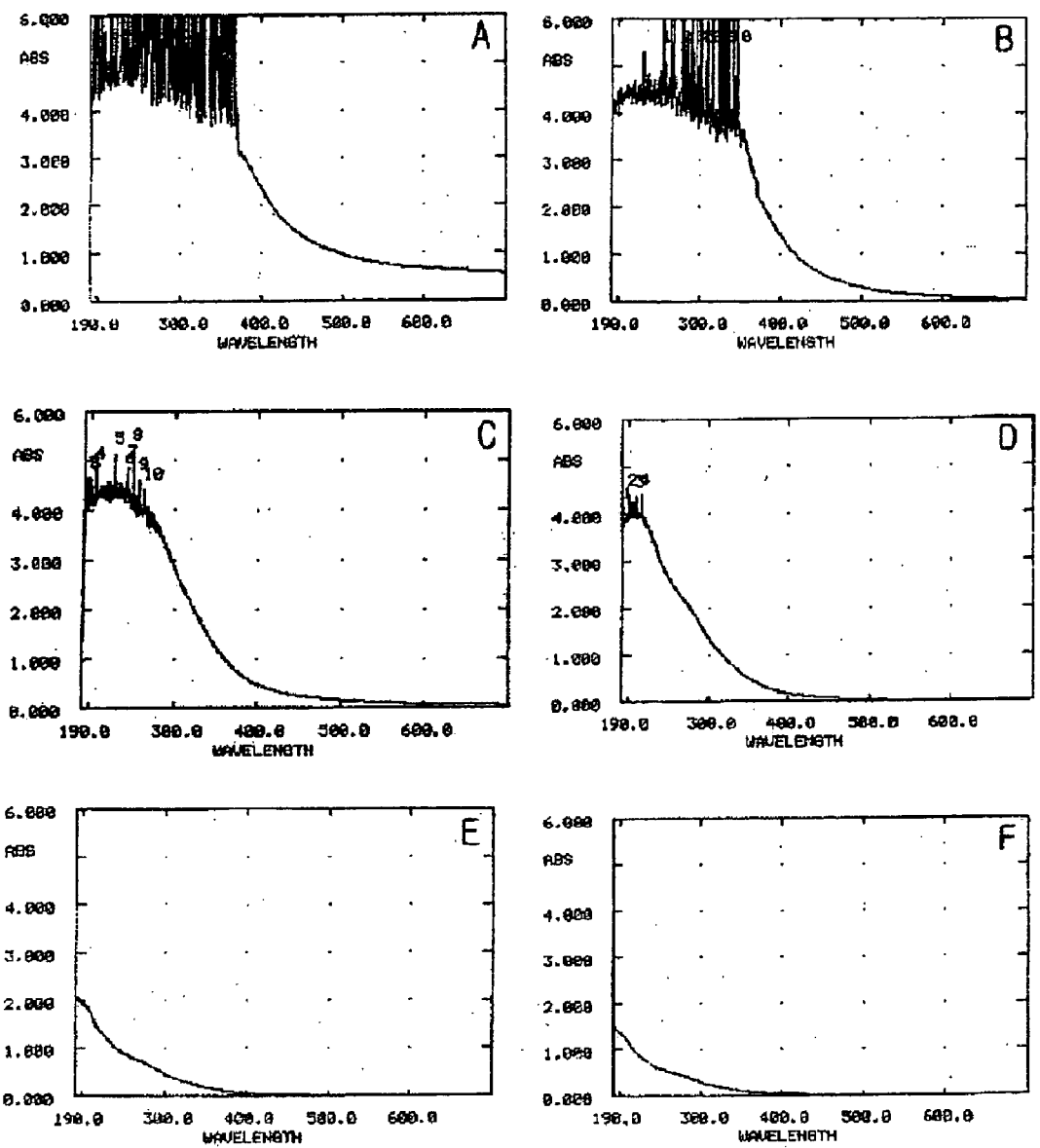
FIG. 5 is an UV scanning of Humic Acid (compost comes from the pine trees and oak trees) treated by the algae and diatoms to show progressing for a week interval.
Figure 6A:
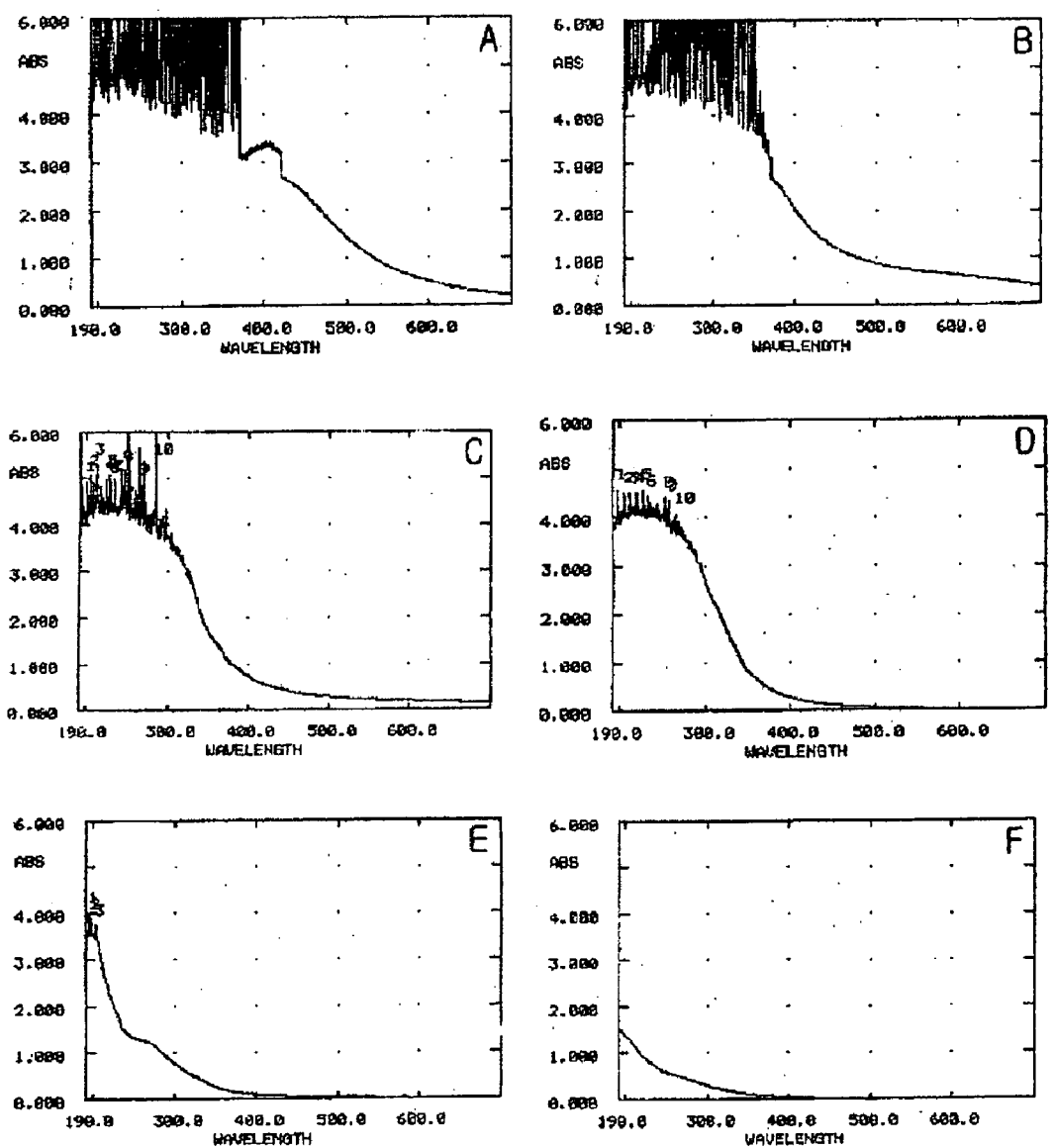
FIG. 6a is an UV scanning of wastewater containing coffee residues treated by the algae and diatoms to show progressing for a week interval.

An animal farm employs a facility to treat the animal excreta of 5,000 swine. The collected animal excreta of 30 tons per day are pre-treated to separate the solid portion and liquid portion by adding precipitants. The liquid portion is pre-treated 24 hours to be COD 542 ppm, TN 96 ppm by the active sludge treatment. Then 50 ppm of Ca++(calcium) salt is added to the pre-treated wastewater. Then, the pre-treated wastewater is sequentially flowed through the multi-filtering tanks, in which are cultivated the algae and which are filled with a mixture of soil, oyster powder and phosphate rock. The filtering tank has a 30 ton capacity and consists of 5~10 stages. The UV scanning analysis of the fully treated effluent water is shown in FIGS. 2 and 4.

As seen in FIG. 2, the comparison of the before and after treatments for the swine wastewater, it is shown that many kinds of organic substances are evident before the treatment. However, most of the organic substances are nonexistent after the treatment with below 3 ppm of COD.

In the analysis by the visible ray, the comparison of before and after treatments of the swine wastewater shows that most of the brownish colored organic substances are eliminated after treatment.

For example, the result of the wastewater treatment is shown in Table 1 for the swine excreta in the United States. Even though most pollutants (98~99%) are removed, the remaining pollutants (1~2%) in the effluent cause serious problems as they accumulate.

As shown in Table 1, an example of a current swine waste treatment result is presented that:

In order to prevent polluting water from such swine wastewater, the remaining 1~2% of pollutants must be further processed before dumping into nature. Unfortunately, the current technology of the biological treatment cannot completely remove the remaining COD and Nitrogen. As shown in FIG. 1, the chemical oxygen demand (COD) is composed of several hundred organic compounds. These organic compounds cannot be decomposed by the bacteria or fungi.

Throughout the current research, the organic compounds that cannot be degraded by bacteria or fungi are found to be easily removed by the algae and diatoms cultivated under a special condition. Algae and diatoms utilize COD and nitrogen as their growth nutrients. Such removal is up to a point where there is hardly any trace of COD and nitrogen compared to the conventional technology.

Such a technology may seem improbable and very expensive, but it is proven to be extremely successful and very effective at lowering the cost during the research. Applying the breakthrough technology could be more than enough to stop accumulating residual pollutants in the water. In addition to reducing water pollution, the new method will also help reduce air pollution and soil pollution.

IMPLEMENTING EXAMPLE 2

For treating the urban sewage water, the solid substance in the wastewater is settled out in the precipitation tanks. Then, calcium salt (Ca) is added to the primarily treated wastewater. Then, the primarily treated sewage water is sequentially flowed through the multi-filtering tanks (same as in example 1). A small amount of air is supplied for diluting the carbon dioxide. For stimulating the photosynthesis of the algae and diatoms, artificial illumination is installed under or above the water being treated.

IMPLEMENTING EXAMPLE 3

For treating the runoff wastewater from a garbage dumpsite, calcium salt (Ca) is added into the runoff wastewater. Then, the primarily treated wastewater is sequentially flowed through the multi-filtering tanks (same as in example 1). A small amount of air is supplied for diluting the carbon dioxide. For stimulating the photosynthesis of the algae and diatoms, artificial illumination is installed under or above the water being treated.

IMPLEMENTING EXAMPLE 4

For treating the sewage stream of wastewater, calcium salt (Ca) is added into the sewage stream. Then, the primarily treated sewage water is sequentially flowed through the multi-filtering tanks (same as in example 1). A small amount of air is supplied for diluting the carbon dioxide. For stimulating the photosynthesis of the algae and diatoms, artificial illumination is installed under or above the water being treated.

IMPLEMENTING EXAMPLE 5

For treating colored wastewater, which contains the residue of coffee or red tea, calcium salt (Ca) is added into the colored wastewater. Then, the primarily treated wastewater is sequentially flowed through the multi-filtering tanks (same as in example 1).

The scanning tests of the Implementing Examples 1 to 5 are shown in FIGS. 4 to 6b.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of biological treatment for completely removing compost decomposed from dissolved organic matter (COD) by decomposers, the method biological treatment comprising the steps of:
   adopting algae and diatoms that are cultivated under special conditions to treat wastewater containing excreta,
   applying Calcium Salt and Silica Salt to develop a competence cell in said algae and diatoms,
   removing insoluble compost contained in the wastewater and excreta, after the dissolved organic matter (COD) have been decomposed by the decomposers, and
   removing pollutants contained in the wastewater through a series of multiple stage treatment tanks, which consist of 3~1,000 stages each 4~8 inches in width and sequentially diluting the wastewater under different cultivating conditions.

2. The method of biological treatment as set forth in claim 1, the method is further comprising the steps of:
   improving the efficiency of cultivation of the algae and diatoms by installing artificial illumination,
   insulating a cultivation place of the algae and diatoms with plastic, vinyl or glass to maintain optimum temperature, and
   stimulating the algae and diatoms to photosynthesize with nitrate gas without forcibly expelling nitro-nutrition dissolved in the wastewater into the air.

* * * * *